United States Patent
Schroder et al.

(10) Patent No.: US 10,644,317 B2
(45) Date of Patent: *May 5, 2020

(54) ELECTRODE HAVING AN INTERPHASE STRUCTURE

(71) Applicant: EnPower, Inc., Phoenix, AZ (US)

(72) Inventors: Kjell William Schroder, Medford, MA (US); Adrian Yao, Phoenix, AZ (US); Neelam Singh, Fremont, CA (US)

(73) Assignee: EnPower, Inc., Phoenix, AZ (US)

( * ) Notice: Subject to any disclaimer, the term of this patent is extended or adjusted under 35 U.S.C. 154(b) by 68 days.

This patent is subject to a terminal disclaimer.

(21) Appl. No.: 16/120,376

(22) Filed: Sep. 3, 2018

(65) Prior Publication Data

US 2019/0036125 A1    Jan. 31, 2019

Related U.S. Application Data

(63) Continuation of application No. 15/961,032, filed on Apr. 24, 2018, now Pat. No. 10,069,145, which is a
(Continued)

(51) Int. Cl.
*H01M 4/62* (2006.01)
*H01M 4/04* (2006.01)
(Continued)

(52) U.S. Cl.
CPC ............ *H01M 4/62* (2013.01); *H01G 9/0029* (2013.01); *H01G 9/04* (2013.01); *H01G 9/155* (2013.01);
(Continued)

(58) Field of Classification Search
CPC .......... H01M 4/62; H01M 4/139; H01M 4/13; H01M 4/0411; H01M 4/043;
(Continued)

(56) References Cited

U.S. PATENT DOCUMENTS 5,873,523 A    2/1999  Gomez et al.
7,138,208 B2   11/2006 Tanjo et al.
(Continued)

FOREIGN PATENT DOCUMENTS

WO    2011/029058 A2    3/2011

OTHER PUBLICATIONS

U.S. Receiving Office, International Search Report and Written Opinion of the International Searching Authority, dated Oct. 11, 2018, in PCT/US2018/043777, which is the international application to this U.S. application.
(Continued)

*Primary Examiner* — Stewart A Fraser
(74) *Attorney, Agent, or Firm* — Kolitch Romano LLP

(57) ABSTRACT

Methods are disclosed for manufacturing an electrode for use in a device such as a secondary battery. Electrodes may include a first layer having first active particles adhered together by a binder, a second layer having second active particles adhered together by a binder, and an interphase layer interposed between the first and second layers. In some examples, the interphase layer may include an interpenetration of the first and second particles, such that substantially discrete fingers of the first layer interlock with substantially discrete fingers of the second layer.

20 Claims, 9 Drawing Sheets

Related U.S. Application Data continuation of application No. 15/663,524, filed on Jul. 28, 2017, now Pat. No. 10,038,193.

(51) Int. Cl.

| | | |
|---|---|---|
| *H01G 9/00* | (2006.01) | |
| *H01M 4/139* | (2010.01) | |
| *H01M 10/0525* | (2010.01) | |
| *H01G 9/04* | (2006.01) | |
| *H01G 11/38* | (2013.01) | |
| *H01G 11/28* | (2013.01) | |
| *H01G 11/26* | (2013.01) | |
| *H01M 4/13* | (2010.01) | |
| *H01G 11/04* | (2013.01) | |
| *H01G 11/46* | (2013.01) | |
| *H01M 4/02* | (2006.01) | |
| *H01G 11/32* | (2013.01) | |

(52) U.S. Cl.
CPC ............ *H01G 11/04* (2013.01); *H01G 11/26* (2013.01); *H01G 11/28* (2013.01); *H01G 11/38* (2013.01); *H01M 4/0402* (2013.01); *H01M 4/043* (2013.01); *H01M 4/0404* (2013.01); *H01M 4/0409* (2013.01); *H01M 4/0411* (2013.01); *H01M 4/0416* (2013.01); *H01M 4/13* (2013.01); *H01M 4/139* (2013.01); *H01M 10/0525* (2013.01); *H01G 11/32* (2013.01); *H01G 11/46* (2013.01); *H01M 2004/021* (2013.01)

(58) Field of Classification Search
CPC ............ H01M 4/0409; H01M 4/0404; H01M 4/0402; H01G 11/28; H01G 11/38
See application file for complete search history.

(56) References Cited

U.S. PATENT DOCUMENTS

| | | |
|---|---|---|
| 7,348,101 B2 | 3/2008 | Gozdz et al. |
| 7,579,112 B2 | 8/2009 | Chiang et al. |
| 7,682,740 B2 | 3/2010 | Yong et al. |
| 7,745,048 B2 | 6/2010 | Hwang et al. |
| 7,781,098 B2 | 8/2010 | Chiang et al. |
| 8,062,789 B2 | 11/2011 | Kim et al. |
| 8,323,815 B2 | 12/2012 | Beard |
| 8,361,663 B2 | 1/2013 | Kang et al. |
| 8,409,511 B2 | 4/2013 | Thomas et al. |
| 8,591,604 B2 | 11/2013 | Berkowitz et al. |
| 8,669,008 B2 | 3/2014 | Cho et al. |
| 8,778,539 B2 | 7/2014 | Ohsawa et al. |
| 9,178,209 B2 | 11/2015 | Kim et al. |
| 9,209,482 B2 | 12/2015 | Chu et al. |
| 9,263,730 B2 | 2/2016 | Suzuki |
| 9,543,568 B2 | 1/2017 | Sung et al. |
| 9,564,639 B2 | 2/2017 | Huang |
| 9,570,736 B2 | 2/2017 | Galande et al. |
| 9,583,756 B2 | 2/2017 | Ann et al. |
| 10,038,193 B1 | 7/2018 | Schroder et al. |
| 2003/0054249 A1 | 3/2003 | Yamamoto et al. |
| 2003/0099884 A1 | 5/2003 | Chiang et al. |
| 2005/0236732 A1 | 10/2005 | Brosch et al. |
| 2008/0057401 A1 | 3/2008 | Mori et al. |
| 2010/0297213 A1 | 11/2010 | Dupont et al. |
| 2011/0123866 A1 | 5/2011 | Pan et al. |
| 2011/0168550 A1 | 7/2011 | Wang et al. |
| 2012/0183842 A1 | 7/2012 | Kawasaki et al. |
| 2012/0219841 A1 | 8/2012 | Bolandi et al. |
| 2012/0328942 A1 | 12/2012 | Thomas-Alyea et al. |
| 2014/0059820 A1 | 3/2014 | Wright et al. |
| 2014/0154401 A1 | 6/2014 | Salot et al. |
| 2014/0178769 A1 | 6/2014 | Pirk et al. |
| 2014/0287316 A1 | 9/2014 | Ann et al. |
| 2014/0377661 A1 | 12/2014 | Lee et al. |
| 2015/0027615 A1 | 1/2015 | Singh et al. |
| 2015/0194678 A1 | 7/2015 | Jeong et al. |
| 2016/0013480 A1 | 1/2016 | Sikha et al. |
| 2016/0211523 A1 | 7/2016 | Hao et al. |
| 2016/0285101 A1 | 9/2016 | Yoshio et al. |
| 2016/0336617 A1 | 11/2016 | Yamazaki |
| 2016/0351941 A1 | 12/2016 | Kobayashi |
| 2017/0098823 A1 | 4/2017 | Yushin et al. |
| 2017/0125788 A1* | 5/2017 | Ahn ................. H01M 4/133 |

OTHER PUBLICATIONS

U.S. Patent and Trademark Office, Office action in U.S. Appl. No. 15/663,524 dated Dec. 22, 2017, which is another application of Applicant EnPower, Inc. that shares the same priority as this U.S. application.

U.S. Patent and Trademark Office, Notice of Allowance in U.S. Appl. No. 15/961,032 dated Jul. 12, 2018, which is another application of Applicant EnPower, Inc. that shares the same priority as this U.S. application.

* cited by examiner

ELECTRODE HAVING AN INTERPHASE STRUCTURE

FIELD

This disclosure relates to devices and methods for electrochemical devices that include a composite porous electrode. More specifically, disclosed embodiments relate to multilayer electrodes for batteries.

INTRODUCTION

Environmentally friendly sources of energy have become increasingly critical, as fossil fuel-dependency becomes less desirable. Most non-fossil fuel energy sources, such as solar power, wind, and the like, require some sort of energy storage component to maximize usefulness. Accordingly, battery technology has become an important aspect of the future of energy production and distribution. Most pertinent to the present disclosure, the demand for secondary (i.e., rechargeable) batteries has increased. Various combinations of electrode materials and electrolytes are used in these types of batteries, such as lead acid, nickel cadmium (Ni-Cad), nickel metal hydride (NiMH), lithium ion (Li-ion), and lithium ion polymer (Li-ion polymer).

SUMMARY

The present disclosure provides systems, apparatuses, and methods relating to electrodes having interphase structures, suitable for use with electrochemical energy storage devices such as supercapacitors, hybrid battery-capacitors, and secondary batteries. Secondary batteries include currently commercialized technologies (e.g., nickel cadmium, Lithium-ion cells) and developing technologies (e.g., fluoride-ion, magnesium-ion, sodium-ion, aluminum-ion). In some embodiments, an electrode in accordance with aspects of the present disclosure may include: a current collector substrate; and an active material composite layered onto the substrate, wherein the active material composite comprises: a first layer including a plurality of first active material particles having a first distribution of particle sizes; a second layer including a plurality of second active material particles having a second distribution of particle sizes; and an interphase layer adhering the first layer to the second layer, the interphase layer including a non-planar interpenetration of the first and second layers in which first fingers of the first layer interlock with second fingers of the second layer.

In some embodiments, an electrode in accordance with aspects of the present disclosure may include: a current collector substrate; and an active material composite layered onto the substrate, wherein the active material composite comprises: a first layer including a plurality of first active material particles adhered together by a first binder, the first active material particles having a first average particle size; a second layer including a plurality of second active material particles adhered together by a second binder, the second active material particles having a second average particle size; and an interphase layer adhering the first layer to the second layer, the interphase layer including a non-planar boundary between the first and second layers, such that the first layer and the second layer are interpenetrated and the interphase layer has a third average particle size, a magnitude of which is between the first average particle size and the second average particle size.

In some embodiments, a method of manufacturing an electrode in accordance with aspects of the present disclosure may include causing a current collector substrate and an active material composite dispenser to move relative to each other; and coating at least a portion of the substrate with an active material composite, using the dispenser, wherein coating includes: applying a first layer to the substrate using a first orifice of the dispenser, the first layer including a first active material composite slurry having a plurality of first particles and a first binder, the first particles having a first average particle size and a first viscosity; applying a second layer to the first layer using a second orifice of the dispenser, the second layer including a second active material composite slurry having a plurality of second particles and a second binder, the second particles having a second average particle size and a second viscosity; and forming an interphase layer adhering the first layer to the second layer, the interphase layer including an interpenetration of the first and second layers in which first fingers of the first layer interlock with second fingers of the second layer.

Features, functions, and advantages may be achieved independently in various embodiments of the present disclosure, or may be combined in yet other embodiments, further details of which can be seen with reference to the following description and drawings.

DESCRIPTION

Figure 1:
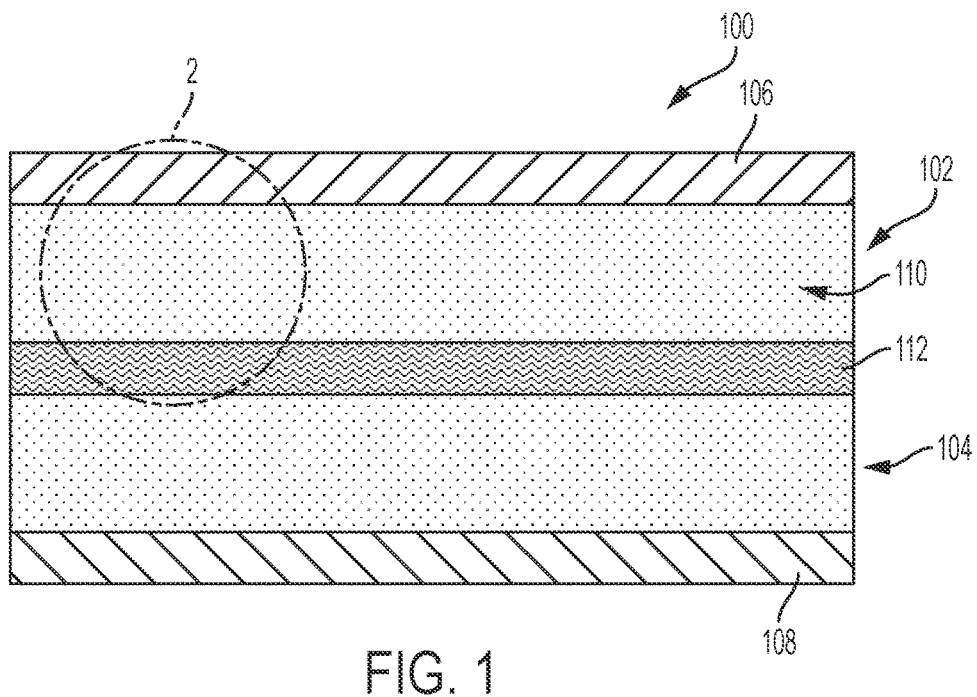
FIG. 1 is a schematic sectional view of an illustrative electrochemical cell.

Various aspects and examples of an electrode having an interphase layer, as well as related devices and methods, are described below and illustrated in the associated drawings.

Unless otherwise specified, an electrode having an interphase structure as described herein, and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Coupled" means connected, either permanently or releasably, whether directly or indirectly through intervening components.

"Secondary battery" means a rechargeable battery, e.g., a type of electrical battery which can be charged, discharged by a load, and recharged multiple times.

Overview

In general, an electrode with interphase structure described herein may include an electrode for use in a bipolar device, e.g., a lithium ion battery, that includes at least two zones or layers that have different microstructures. In some examples, the layers have different porosities, different materials chemistries, and/or different active material particle sizes. In some examples, the electrode has at least one layer within which is a gradient of active materials chemistries, a gradient of particle sizes, and/or a multimodal distribution of active material particle sizes. As described further below, the two layers may be adhered together via an interphase, which may comprise a non-planar transitional zone between the two layers. In some examples, the interphase includes a higher concentration of binder molecules.

An electrode having more than one zone or layer may have regions of low and high porosity, such that the overall electrode has increased energy density as compared with a homogeneous electrode of an equivalent loading or thickness. By including the interphase, the electrode may maintain power density and durability (e.g., maintaining mechanical integrity during expansion and contraction of the electrode), electron percolation (i.e., electronically connected), ion conduction, resistance to solid electrolyte interphase (SEI) buildup, and manufacturing cost effectiveness.

An electrode may have a thickness measured as a distance perpendicular to the plane of a current collector to which the electrode is adhered, between the current collector and an opposing surface of the electrode. The opposing surface (also called the upper surface) may be substantially planar. This upper surface of the electrode may mate with a separator, a gel electrolyte, or a solid electrolyte when the electrode is included in a cell. In some examples, an electrode including the interphase of the present disclosure may have a thickness between 20 µm and 1 mm.

Examples, Components, and Alternatives

The following sections describe selected aspects of exemplary devices having electrodes with interphase structures as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Battery

The present teachings disclose a new bipolar electrochemical device (e.g., a battery or electrochemical cell) and electrodes included therein. For example, embodiments disclosed herein may include or be suitable for use in a lithium ion battery cell.

Referring now to FIG. 1, a lithium ion battery cell 100 is illustrated, which includes two electrodes, a negative electrode (also known as an anode 102) and a positive electrode (also known as a cathode 104). Current collectors 106, 108, which may comprise metal foils or other suitable substrates, are electrically coupled to the two electrodes. The current collectors enable the flow of electrons, and thereby electrical current, into and out of each electrode. An electrolyte 110 enables the transport of ions between the electrodes 102, 104. In the present example, electrolyte 110 is a liquid with dissolved ions that facilitates an ionic connection between electrodes 102 and 104.

Electrolyte 110 is typically assisted by a separator 112, which physically partitions the space between the cathode and anode while being liquid permeable and enabling the flow of ions within electrolyte 110 and between each electrode. In some embodiments, a polymer gel or solid ion conductor augments or takes the place of (and performs the function of) the separator.

The electrodes themselves are composite structures, which comprise active material particles, a binder, a conductive additive, and pores (void space) for the electrolyte to penetrate. An arrangement of constituent parts of an electrode is referred to as a microstructure or more specifically, an electrode microstructure.

The binder is typically a polymer, e.g., polyvinylidene difluoride (PVdF), and the conductive additive typically includes a nanometer-sized carbon, e.g., carbon black, or graphite. In some examples, the binder is a mixture of carboxyl-methyl cellulose (CMC) and styrene-butadiene rubber (SBR). In some examples, the conductive additive includes a ketjen black, a graphitic carbon, a low dimensional carbon (e.g., carbon nanotubes), or a carbon fiber.

The chemistry of the active material particles differ between anode 102 and cathode 104. For example, the anode may include graphite, Titanate, titania, transition metals in general, elements in group 14 (e.g., carbon, silicon, tin, germanium, etc.), oxides, sulfides, transition metals, halides, and chalcogenides. The cathode may include transition metals (for example, nickel, cobalt, manganese, copper, zinc, vanadium, chromium, iron), and their oxides, phosphates, phosphites, and silicates. The cathode may also include alkalines and alkaline earth metals, aluminum, aluminum oxides and aluminum phosphates, as well as halides and chalcogenides. In an electrochemical device, active materials participate in an electrochemical reaction or process with a working ion (in lithium-ion batteries, lithium ions are the working ions) to store or release energy.

In the present example, during operation of a lithium ion battery, lithium ions move between being included in the active material particles and being solvated in the electrolyte. The mass of active material divided by the total mass of an electrode (or a cell) is known as the active material fraction. The volume of active material divided by the total volume of an electrode (or a cell) is known as the active volume fraction.

Figure 2:
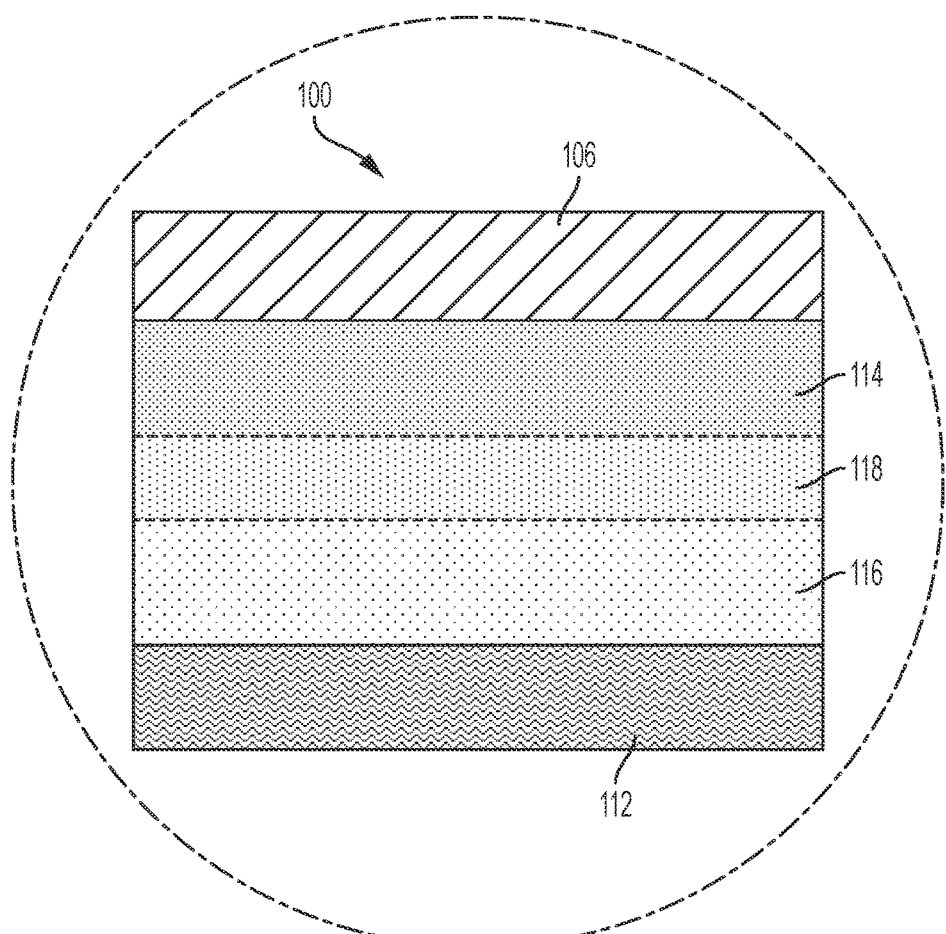
FIG. 2 is a magnified view of a portion of the cell of FIG. 1.

FIG. 2 shows a magnified portion of cell 100. In this example, which is not the case in other such batteries, the electrode is layered, with a first layer 114, a second layer 116, and an intermediate interphase layer 118. Each of these structures is described in further detail below.

B. Illustrative Electrode Layer Structures

Three challenges exist in battery technologies: enabling devices with (1) higher energy density, (2) higher power density, and (3) lower cost than those currently available. The energy density and power density of an electrochemical cell are the result of a complex interplay of physical and electrochemical properties of the cell, including electrochemical and physical properties of the electrodes, the separator, the current collector, and the electrolyte.

Electrodes are the energy storing components of an electrochemical energy storage device (e.g., a lithium-ion battery or a super capacitor), and are often a composite structure made of active material particles and electrically conductive particles embedded in a polymeric binder matrix, as described above.

Physical properties that determine the electrical and electrochemical performance of electrodes include: average size (e.g., volume) and size distributions of the active material particles, shapes and morphology of the active particles, electrode porosity, electrode thickness, active mass fraction, and the method and efficacy of current collection (within the electrode and from the electrode to an external circuit). These parameters may be extensively tailored to reduce electrode impedance and increase cell performance.

A major factor affecting the energy density of an electrode (and thus of an electrochemical energy storage device) is the electrode active mass loading. The greater the active mass loading of an electrode, the higher the electrode's energy storage capacity. Accordingly, a first strategy to improve device energy density is to use a high active mass loading (i.e., high capacity) electrode. This first strategy is effective at increasing a cell's energy density by increasing a mass (or volume) of active material, compared to a mass (or volume) of inactive components (e.g., current collector, separator). An increase in an active mass fraction (or equivalently an active volume fraction) of a packaged cell may be achieved in this way. In addition, higher active mass loading electrodes lead to a reduction in cell costs per unit energy. A second strategy to improve energy density is to increase an active material fraction by dense packing of active material particles (for example, in a given volume).

However, both of these strategies may have undesired consequences that limit other aspects of cell performance. For example, an increase in the active mass loading without increasing density increases a thickness of an electrode. Increasing the thickness of an electrode can adversely affect power performance. Typically, a battery electrode is manufactured by coating a uniform single layer of a slurry on a current collector substrate. As the thickness of the electrode increases, the distance between active material particles which are farthest from the current collector and the current collector itself increases. As one consequence, the length of a path that an electron must take to get to the active materials particles farthest from the current collector is increased. As another consequence, the path that an ion must travel from a location outside the electrode to an active material particle located close to the current collector also increases. Thus, increasing electrode thicknesses leads to increased ohmic resistance and reduced ionic conductivity across the thickness of the electrode. Since a power density of an electrode is related to ionic and electronic transport between electrode and electrolyte, a reduction in these conductivities reduces the power density, resulting in an inverse relationship between the electrode thickness and power density of a battery.

Similarly, there are adverse effects observed when a packing density of active material particles is increased. For example, an increase in packing density may decrease the void space in an electrode, resulting in a less-connected network of void space. As a consequence, a length of a path that an ion must take to get to a surface of a given active material particle may be more tortuous (and therefore longer), compared to a length of a path an ion may take in a more porous electrode. In this way, increasing packing density may reduce ionic conductivity within the electrode, adversely affecting power density.

Additionally, in a typical example, the density of active material and the porosity of the microstructure are uniform throughout an electrode. By packing active material particles closely together and/or making electrodes very thick, concentration gradients of lithium ions may build up within the composite electrode pores when a device is operated at a fast rate (e.g., rapid charging or discharging). This phenomenon is known as polarization and limits rate performance (and thus power density) in a device. Based on all of these considerations, there is typically a clear trade-off between energy density and power density when designing a cell.

A maximum thickness of battery electrodes is generally limited to 100 microns for most current applications. Increasing this maximum thickness to 200 microns or more is understood to increase volumetric and gravimetric energy densities by up to 35%. Increasing electrode thicknesses and/or densities of electrodes are also understood to have major impacts on the economics of battery manufacturing, packaging, and end use in multiple applications ranging from consumer electronics to transportation and grid storage. It would be highly advantageous to design an electrode with structures to mitigate or overcome a trade-off between energy density and power.

Significant advances have been made, but existing solutions fall short in solving these problems. To at least partially address these challenges, electrodes with non-uniform microstructure have been proposed. In one example, an electrode includes at least two layers with differing microstructures (e.g., different active materials, porosity, particle size distributions). These layers may further include a continuous variation in microstructure over a layer. However, solutions involving the formation and properties of an interphase have largely been ignored.

Operation of an energy storage device under demanding conditions at the limits of an electrode's capabilities requires accommodating stresses induced by volume expansion (swelling) and contraction during the charging and discharging of battery electrodes. This leads to four interrelated challenges. In a first case, a mechanical integrity (coherence) of the electrode must be maintained so that a first electrode layer and a second electrode layer remain adhered to each other (i.e., mechanically stable). In a second case, the first layer and the second layer must remain electronically connected (percolated), enabling the flow of electrons from the first layer to the second and vice versa. In a third case, the interface between the layers should not block or inhibit the flow of ions, which would create electrolyte polarization between the layers. In a fourth case, specifically for anodes, the interface between the layers should not create regions of increased densification, resulting in solid electrolyte interphase (SEI) buildup at the interface between the layers that subsequently blocks pores and induces lithium plating. These issues present a major challenge in making a multilayer electrode with high performance by controlling a mating between two discrete layers.

Figure 3:
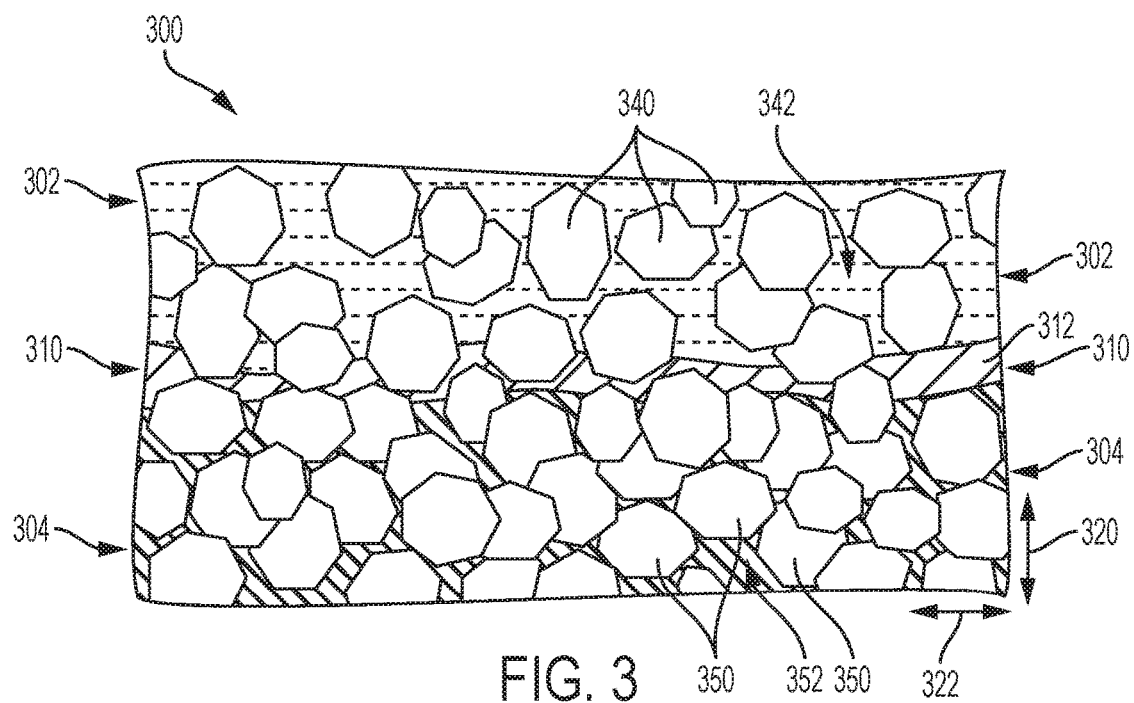
FIG. 3 is a schematic side view of an illustrative electrode portion in accordance with aspects of the present disclosure.

The present disclosure provides structures and devices for achieving non-uniform (e.g., gradient) electrode microstructures, and thus increased energy density, without decreasing power density. FIG. 3 schematically depicts an illustrative electrode portion 300 comprising two active material composite zones or layers 302 and 304. The active material composite layers may be adjacent layers, with each lying in a plane generally parallel to a current collector to which the electrode is adhered. Planes perpendicular to the current collector may lie in the direction indicated at 320, such that active material composite layers 302, 304 are generally parallel to a second direction 322 as well as a direction going into and out of the page of the drawing.

In the present example, first active material composite layer 302 is farther from the current collector, and closer to a separator and second active material composite layer 304 is closer to the current collector and farther from the separator. First active material composite layer 302 includes a plurality of first active material particles 340, a binder 342, and a conductive additive. Second active material composite layer 304 includes a plurality of second active material particles 350, a binder 352, and a conductive additive. Binders 342 and 352 may be the same or different, either in type or in concentration. The first and second conductive additives may be the same or different, either in type and/or in concentration.

An interphase 310 interpenetrates and binds the two active material composite layers 302 and 304. First active material particles 340 include a number of particles having different volumes that form a first distribution of sizes. Second active material particles 350 include a number of particles having different volumes that form a second distribution of sizes. The first and second distributions may be substantially the same or different. One or both distributions may be unimodal or multimodal. The first and second active material particles may have average surface areas which are substantially the same or different, or may have distributions of surface areas with modes that are substantially the same or different. In general, the first plurality of active material particles 340 and second plurality of active material particles 350 can be same or different in chemical composition, type, or morphology.

Interphase 310 may include a mixture of first and second active material particles with an increased concentration of first active material particles, or it may include increased concentration of second active material particles. Interphase 310 may have same composition as the first layer or the second layer or may have a composition that is a mixture of first and second layer composition.

Interphase 310 in the present example includes an increased concentration of binder molecules 312 in comparison to first composite zone 302 and/or second composite zone 304. In some examples, interphase 310 includes an increased concentration of conductive additive molecules and conductive additive particles in comparison to first composite zone 302 and/or second composite zone 304. For example, interphase 310 may comprise carbon black, graphitic carbons, amorphous carbons, low dimensional carbon nanostructures, such as graphene, single-walled carbon nanotubes, multi-walled carbon nanotubes, bucky balls, transition metal and metalloid particles and complexes, and/or the like.

Additionally, these additives may include chemical groups, functionalities, moieties or residues that conduct lithium to improve ionic conduction between first zone 302 and second zone 304. These additives may include chemical groups, functionalities, moieties or residues that conduct electrons to improve electronic conduction between the first zone and the second zone. In further examples, a first work function of the first active material particles may be substantially different from a second work function of the second active material particles.

In this example, interphase 310 may include a conductive additive with a third work function between the first and second work functions. Accordingly, interphase 310 may reduce electrical impedance between the first and second pluralities. In some examples, interphase 310 includes an increased concentration of binder and an increased concentration of conductive additive, in comparison to first composite zone 302 and/or second composite zone 304. For the purposes of the present disclosure, a binder may include those typically known in the art (e.g., PVdF, CMC, SBR) and additional long chain polymeric chemical species, as well as combinations and permutations of polymers, and other long-chain molecules, and/or the like.

In one example, electrode portion 300 is a portion of a cathode included in a lithium ion cell. In this example during charging of the lithium ion cell, first active material particles 340 and second active material particles 350 delithiate. During this process, the active material particles may contract, causing electrode portion 300 (as well as the electrode as a whole) to contract. In contrast, during discharging of the cell, the active material particles lithiate and swell, causing electrode portion 300 and the electrode as a whole to swell.

In an alternate example, electrode portion 300 is a portion of an anode included in a lithium ion cell. In this example, during charging of the lithium ion cell, first active material particles 340 and second active material particles 350 lithiate. During this process, the active material particles may swell, causing electrode portion 300 (as well as the electrode as a whole) to swell. In contrast, during discharging of the cell, active material particles 340 and 350 delithiate and contract, causing contraction of the electrode.

In either of these examples, during swelling and contracting, electrode portion 300 may remain coherent, and the first electrode zone and the second electrode zone remain bound by interphase 310. In general, the increased concentration of the binder and/or conductive additive, relative to the concentration of these constituents in first and/or second electrode zones 302 and 304, function to adhere the two zones together.

In some examples, interphase 310 may include an electrolyte buffer layer. In one example, a binder or additive molecule is included in interphase 310 having a porous structure such that it readily adsorbs electrolyte solvent and/or ions. In another example, a mass of a functionalized molecule, such as a binder or additive is included in interphase 310 where the functionalized molecule includes a group, moiety, or residue which interacts with electrolyte solvent or ions to improve transport of electrolyte into or out of at least one of first zone, 302, second zone 304, or interphase 310.

Figure 4:
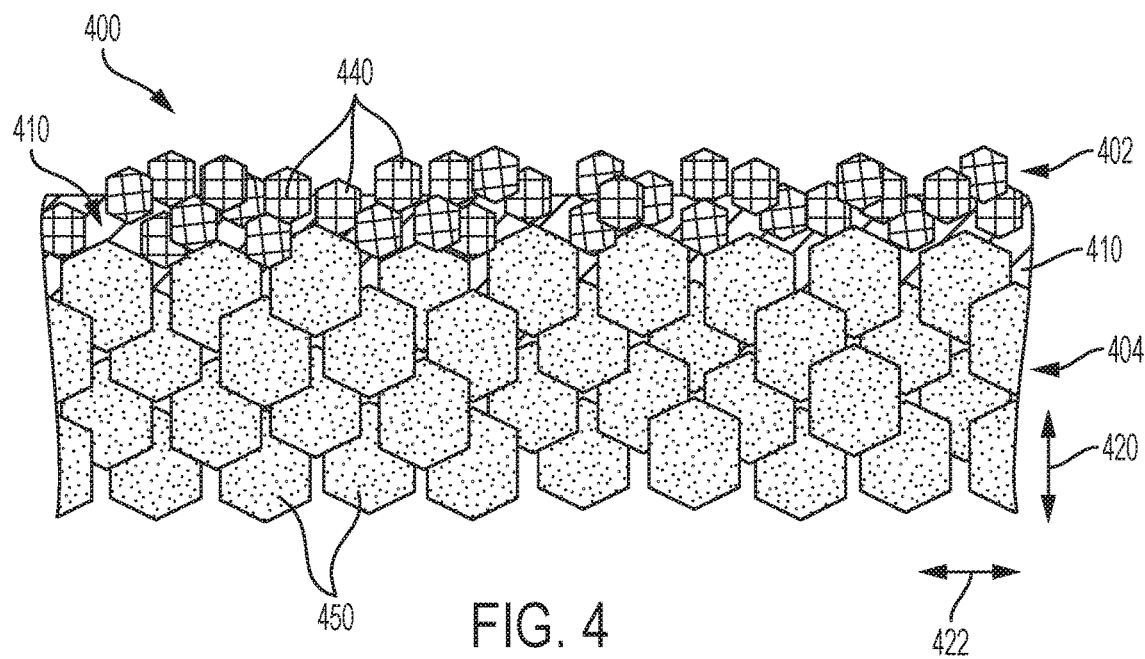
FIG. 4 is a schematic side view of another illustrative electrode portion in accordance with aspects of the present disclosure.

FIG. 4 schematically depicts another illustrative electrode portion 400. In the present example, a plurality of first particles 440 in a first zone or layer 402 has a distribution of volumes which have a smaller average than the average volume of a plurality of second particles 450 in a second zone or layer 404 (i.e., a smaller average size). In some examples, first particles 440 have a collective surface area that is greater than the collective surface area of second particles 450. The plane lying generally perpendicular to the current collector may lie in the direction 420, such that the planes parallel to the current collector include lines parallel to a second direction 422 as well as lines parallel to those going into and out of the page of the drawing.

In some examples, first particles 440 may be further from the current collector, and closer to a separator and second particles 450 may be closer to the current collector and further from the separator. In other examples, the opposite is true. The two pluralities of particles 440 and 450 interpenetrate and bind together in an interphase layer 410.

In the present example, a mechanical interlocking occurs between first particles 440 and second particles 450 within interphase 410, because of the difference in volumes between the first and second particles. The mechanical interlocking enhances the cohesion of electrode portion 400. In this way interphase 410 mechanically stabilizes electrode portion 400 (and the electrode as a whole) during lithiation and delithiation of the active material particles 440 and 450.

Figure 5:
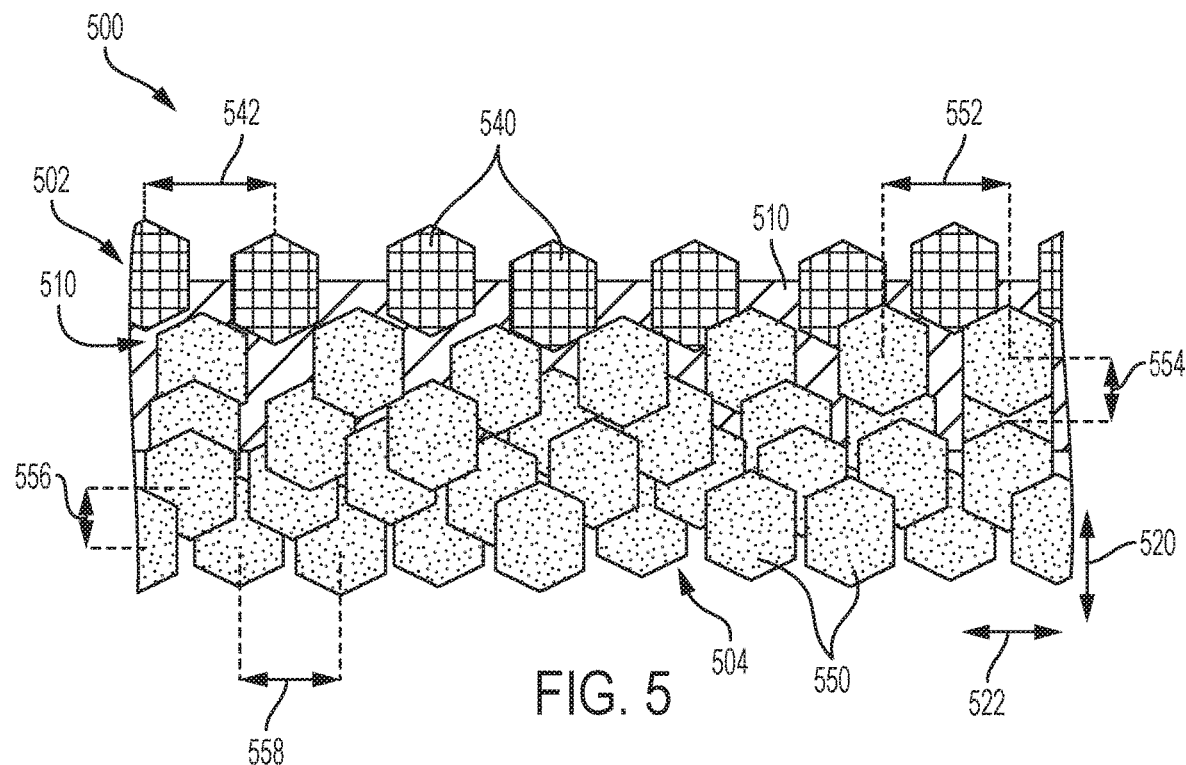
FIG. 5 is a schematic side view of another illustrative electrode portion in accordance with aspects of the present disclosure.

FIG. 5 schematically depicts another illustrative electrode portion 500. The view of FIG. 5 is cross-sectional, such that a direction 520 is substantially perpendicular to a current collector and/or a separator, and a direction 522 is substantially parallel to a current collector and/or a separator. Electrode portion 500 includes a plurality of first active particles 540 in a first zone or layer 502 and a plurality of second active particles 550 in a second zone or layer 504, as well as an interphase 510. Interphase 510 may have a thickness 512 of less than eight microns in direction 520. In additional examples, thickness 512 may be: less than 10 microns; less than 20 microns; less than 40 microns; less than 60 microns; and/or less than 80 microns.

In the present example, an average distance 552 between particles 550 (in direction 522) is greater nearer first particles 540 (along direction 520) than an average distance 558 between those second particles 550 disposed farther away from the first particles. Additionally, an average distance 554 between the second particles (in direction 522) is greater toward the first particles (along direction 520) than an average distance 556 between those second particles disposed farther away from the first particles. In the present example, an average distance 542 between first particles 540 is substantially similar to average distance 552.

The structure of the present example may result from a method of forming an electrode (similar to the method discussed below with respect to FIG. 12) that includes coating a second layer of composite onto a first layer of composite. In this example, the first layer is substantially homogeneous in terms of its porosity, prior to the coating of the second layer. As a result of coating the second layer, solvent from the second layer coating interpenetrates the first layer and causes a swelling within the first layer. As a result, an average distance between a plurality of active material particles comprised within the first layer increases for the portion active material particles disposed closest to the second layer.

Figure 6:
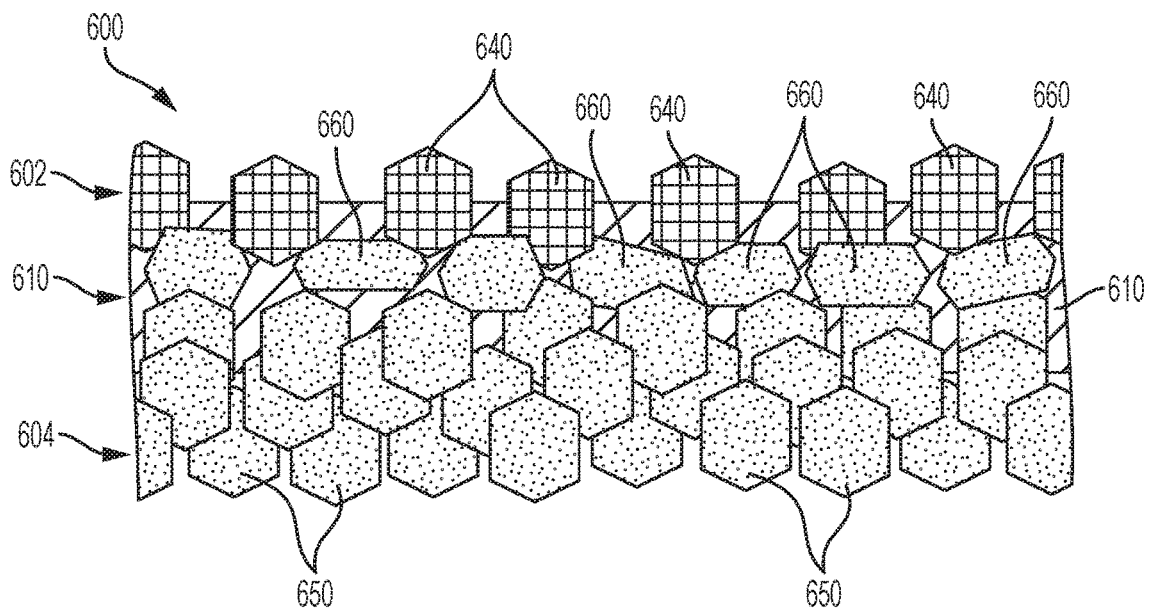
FIG. 6 is a schematic side view of another illustrative electrode portion in accordance with aspects of the present disclosure.
Figure 7:
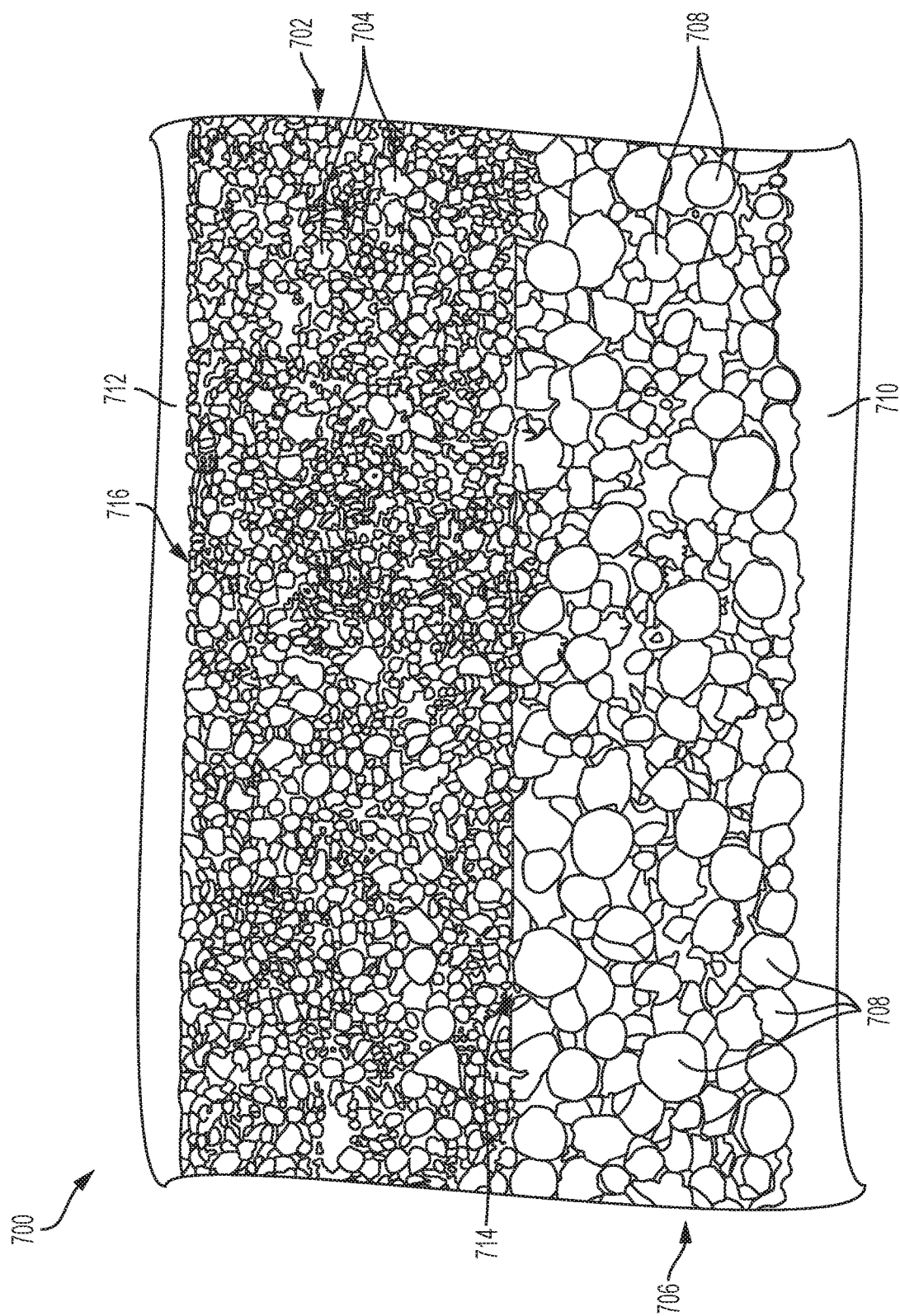
FIG. 7 is a sectional view of an illustrative electrode portion having an intermediate crust layer on a substantially planar boundary.

FIG. 6 schematically depicts another illustrative electrode portion 600. As with the examples above, electrode portion 600 includes a plurality of first active particles 640 in a first zone or layer 602 and a plurality of second active particles 650 in a second zone or layer 604, as well as an interphase 610. In this example, electrode portion 600 also includes a plurality of third active material particles 660. Particles 660 are a subset of the second particles. Here, particles 660 have been compressed, for example during a calendering process, and have a distorted shape, in comparison to the remainder of second particles 650. This layer of crushed or flattened active material forms a planar boundary and may be referred to as a "crust." Such a boundary may be undesirable in many situations. For example, the crust may reduce interpenetration or intermixing of the two particle types, such that the interphase layer is less effective. FIG. 7 is a sectional view of an electrode 700 in which two such crusts are present. Electrode 700 includes a first layer 702 having first particles 704 and a second layer 706 having second particles 708, between a current collector 710 at the bottom and a separator 712 at the top. As depicted in FIG. 7, second particles 708 have been pressed or calendered, forming a crust 714 at a clear planar boundary between the two layers. A second crust 716 is present at the boundary between the first particles and the separator, where the electrode layers were calendered as a whole in preparation for adhering to the separator. As explained throughout this disclosure, this type of electrode may be less than adequate to withstand the challenges of mechanical integrity, electronic percolation, ionic conduction, and SEI buildup between the two active material composite layers.

Figure 8:
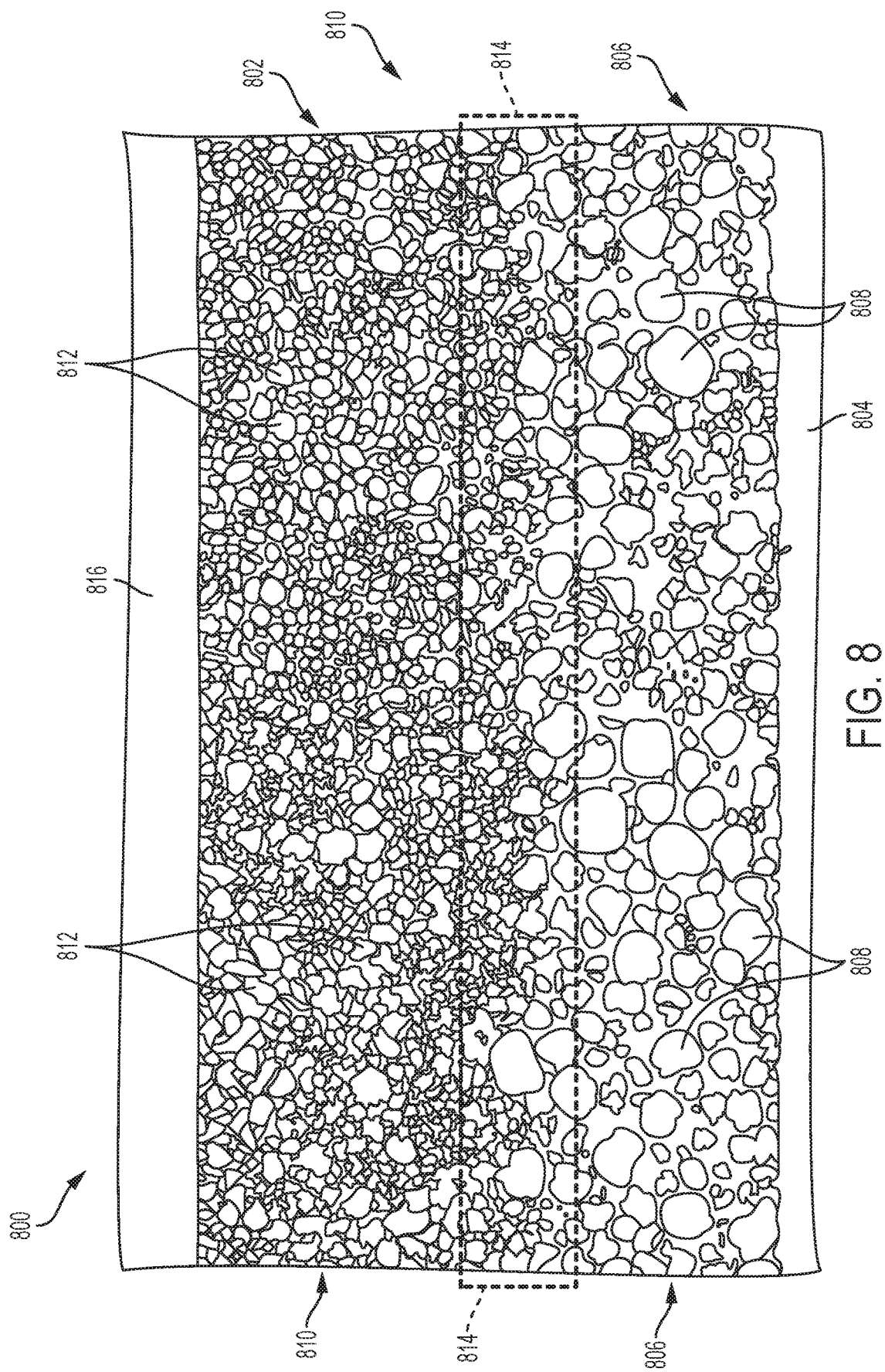
FIG. 8 is a sectional view of an illustrative electrode portion having an interphase layer according to the present teachings.

FIG. 8 is a sectional view of an illustrative electrode portion 800 similar to electrode portions 400 or 500. In this example, active materials 802 have been layered onto a current collector substrate 804. The active materials comprise a first layer 806 including a plurality of first active material particles 808 adhered together by a first binder. The first particles have a first average particle size. Active materials 802 further comprise a second layer 810 including a plurality of second active material particles 812 adhered together by a second binder. The second particles having a second average particle size different than the first. In this example, the second particles are smaller than the first particles.

Electrode portion 800 also includes an interphase layer 814 adhering first layer 806 to second layer 810. In the present example, interphase 814 may have a composition substantially similar to first layer 806, second layer 810, or a physical mixture of the two layers. Further, in the present example interphase 814 may have a binder composition and concentration substantially similar to first layer 806, second layer 810, or a physical mixture of the two layers. Further still, in the present example interphase 814 may have a conductive additive composition and concentration substantially similar to first layer 806, second layer 810, or a physical mixture of the two layers. Interphase layer 814 includes an intermixing or interpenetration of the first particles and the second particles, such that the interphase layer has a third average particle size smaller than the first average particle size and larger than the second average particle size. In other words, interphase layer 814 comprises a gradual transition from the first particles of first layer 806 to the second particles of second layer 810. A separator 816 is adhered to second layer 810.

Figure 9:
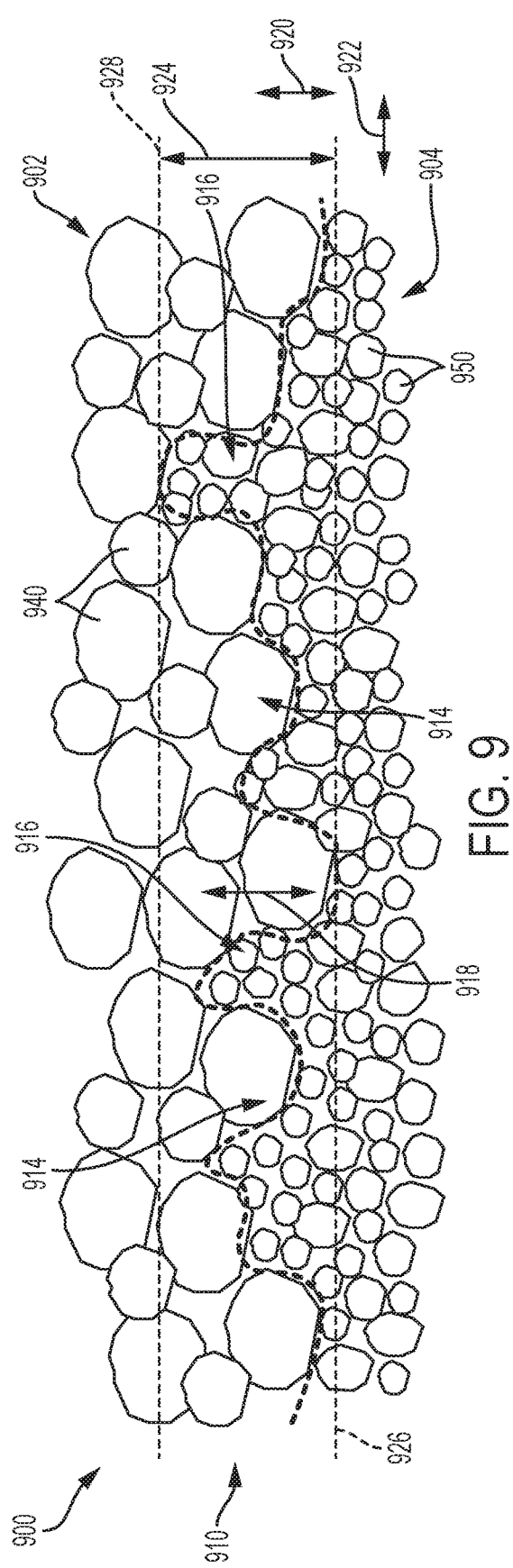
FIG. 9 is a schematic side view of another illustrative electrode portion having interlocking fingers in accordance with aspects of the present disclosure.

FIG. 9 schematically depicts another illustrative electrode portion 900, comprising two active material composite layers 902 and 904. The active material composite layers may be adjacent layers, with each lying in a plane generally parallel to a current collector to which the electrode is adhered. Planes perpendicular to the current collector may lie in the direction indicated at 920, such that active material composite layers 902, 904 are generally parallel to a second direction 922 as well as a direction going into and out of the page of the drawing.

In the present example, first active material composite layer 902 is farther from the current collector, and closer to a separator, and second active material composite layer 904 is closer to the current collector and farther from the separator. First active material composite layer 902 includes a plurality of first active material particles 940, a binder, and a conductive additive. Second active material composite layer 904 includes a plurality of second active material particles 950, a binder, and a conductive additive.

An interphase 910 interpenetrates and binds the two active material composite layers 902 and 904. First active material particles 902 include a number of particles having different volumes that form a first distribution of sizes. Second active material particles 904 include a number of particles having different volumes that form a second distribution of sizes. The first and second distributions may be substantially the same or different. One or both distributions may be unimodal or multimodal. The first and second active material particles may have average surface areas which are substantially the same or different, or may have distributions of surface areas with modes that are substantially the same or different.

Interphase 910 in the present example includes a non-planar boundary between first active material composite layer 902 and second active material composite layer 904. First active material composite layer 902 and second active material composite layer 904 have respective, three-dimensional, interpenetrating fingers 914 and 916 that interlock the two active material composite layers together, forming a mechanically robust interphase that is capable of withstanding stresses due to electrode expansion and contraction. Additionally, the non-planar surfaces defined by first fingers 914 and second fingers 916 represent an increased total surface area of the interphase boundary, which provides more binding sites between the first active material composite layer and the second active material composite layer. Fingers 914 and 916 may be referred to as fingers, protrusions, extensions, projections, and/or the like. Furthermore, the relationship between fingers 914 and 916 may be described as interlocking, interpenetrating, intermeshing, interdigitating, interconnecting, interlinking, and/or the like.

Fingers 914 and fingers 916 are a plurality of substantially discrete interpenetrations, wherein fingers 914 are generally made up of first active material particles 940 and fingers 916 are generally made up of second active material particles 950. The fingers are three-dimensionally interdigitated, analogous to an irregular form of the stud-and-tube construction of Lego bricks. Accordingly, fingers 914 and 916 typically do not span the electrode in any direction, such that a cross section perpendicular to that of FIG. 9 will also show a non-planar, undulating boundary similar to the one shown in FIG. 9. Although fingers 914 and 916 may not be uniform in size or shape, the fingers may have an average or typical length 918. In some examples, length 918 of fingers 914 and 916 may fall in a range between two and five times the average active material particle size of the first active material composite layer or the second active material composite layer, whichever is smaller. In some examples, length 918 of fingers 914, 916 may fall in a range between six and ten times the average active material particle size of the first active material composite layer or the second active material composite layer, whichever is smaller. In some examples, length 918 of fingers 914 and 916 may fall in a range between eleven and fifty times the average active material particle size of the first active material composite layer or the second active material composite layer, whichever is smaller. In some examples, length 918 of fingers 914 and 916 may be greater than fifty times the average active material particle size of the first active material composite layer or the second active material composite layer, whichever is smaller.

In some examples, length 918 of fingers 914 and 916 may fall in a range of approximately two to approximately five µm. In some examples, length 918 of fingers 914 and 916 may fall in a range between approximately six and approximately ten µm. In another example, length 918 of fingers 914 and 916 may fall in a range between approximately eleven and approximately fifty µm. In another example, length 918 of fingers 914 and 916 may be greater than approximately fifty µm.

In the present example, a total thickness 924 of interphase region 910 is defined by the level of interpenetration between the two active material composite layers. A lower limit 926 may be defined by the lowest point reached by first active material composite layer 902 (i.e. by fingers 914). An upper limit 928 may be defined by the highest point reached by the second active material composite layer 904 (i.e. by fingers 916). Total thickness 924 of interphase region 910 may be defined as the separation or distance between limits 926 and 928. In some examples, the total thickness of interphase region 910 may fall within one or more of various relative ranges, such as between approximately 200% (2×) and approximately 500% (5×), approximately 500% (5×) and approximately 1000% (10×), approximately 1000% (10×) and approximately 5000% (50×), and/or greater than approximately 5000% (50×) of the average active material particle size of the first active material composite layer or the second active material composite layer, whichever is smaller.

In some examples, total thickness 924 of interphase region 910 may fall within one or more of various absolute ranges, such as between approximately three and approximately ten µm, approximately ten and approximately fifty µm, approximately fifty and approximately one hundred µm, approximately one hundred and approximately one hundred fifty µm, and/or greater than approximately one hundred fifty µm.

In the present example, first active material particles 940 in first active material composite layer 902 have a distribution of volumes which have a greater average than an average volume of second active material particles 950 in second active material composite layer 904 i.e., a larger average size. In some examples, first active material particles 940 have a collective surface area that is less than the collective surface area of second active material particles 950. In other examples, the opposite is true. First active material particles 940 have a distribution of volumes which have a smaller average than the average volume of second active material particles 950, i.e., a smaller average size. In some examples, first active material particles 940 have a collective surface area that is greater than a collective surface area of second active material particles 950.

In the present example, first active material particles 940 and second active material particles 950 are substantially spherical in particle morphology. In other examples, one or both of the plurality of active material particles in either active material composite layer may have particle morphologies that are: flake-like, platelet-like, irregular, potato-shaped, oblong, fractured, agglomerates of smaller particle types, and/or a combination of the above.

When particles of electrode portion 900 are lithiating or delithiating, as explained above with respect to electrode 300, (i.e., during swelling and contracting), electrode portion 900 remains coherent, and the first active material composite layer and the second active material composite layer remain bound by interphase 910. In general, the interdigitation or interpenetration of fingers 914 and 916, as well as the increased surface area of the interphase boundary, function to adhere the two zones together.

Figure 10:
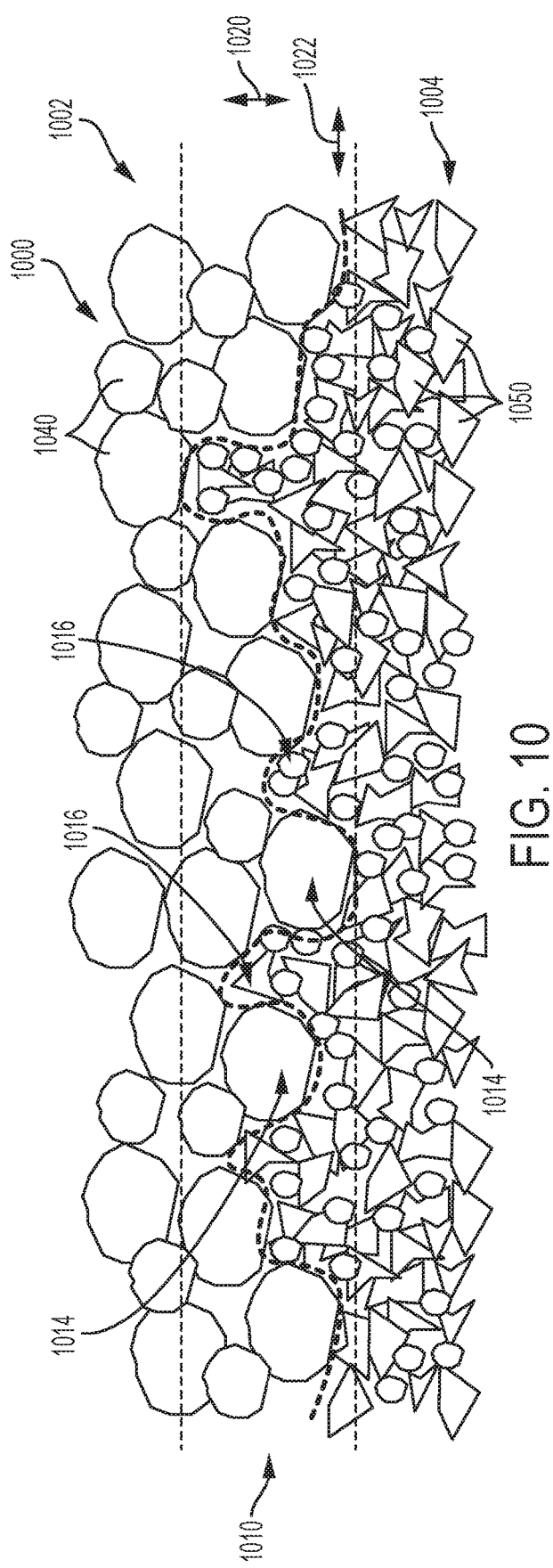
FIG. 10 is a schematic side view of another illustrative electrode portion having interlocking fingers in accordance with aspects of the present disclosure.

FIG. 10 schematically depicts another illustrative electrode portion 1000 comprising two active material composite layers 1002 and 1004 forming an interphase 1010 having interlocked fingers 1014 and 1016. The active material composite layers may be adjacent layers, with each lying in a plane generally parallel to a current collector to which the electrode is adhered. Planes perpendicular to the current collector may lie in the direction indicated at 1020, such that active material composite layers 1002 and 1004 are generally parallel to a second direction 1022 as well as a direction going into and out of the page of the drawing.

In the present example, first active material composite layer 1002 is farther from the current collector, and closer to a separator, and second active material composite layer 1004 is closer to the current collector and farther from the separator. First active material composite layer 1002 includes a plurality of first active material particles 1040, a binder, and a conductive additive. Second active material composite layer 1004 includes a plurality of second active material particles 1050, a binder, and a conductive additive.

Electrode 1000 is substantially similar to electrode 900, and in general may be described in similar terms. In the present example of FIG. 10, however, first active material particles 1040 in first active material composite layer 1002 are substantially spherical in particle morphology, whereas second active material particles 1050 in second active material composite layer 1004 are spherical, flake-like, platelet-like, irregular, potato-shaped, oblong, fractured, agglomerates of smaller particle types, or a combination of the above in particle morphology. In other examples, the opposite may be true.

Figure 11:
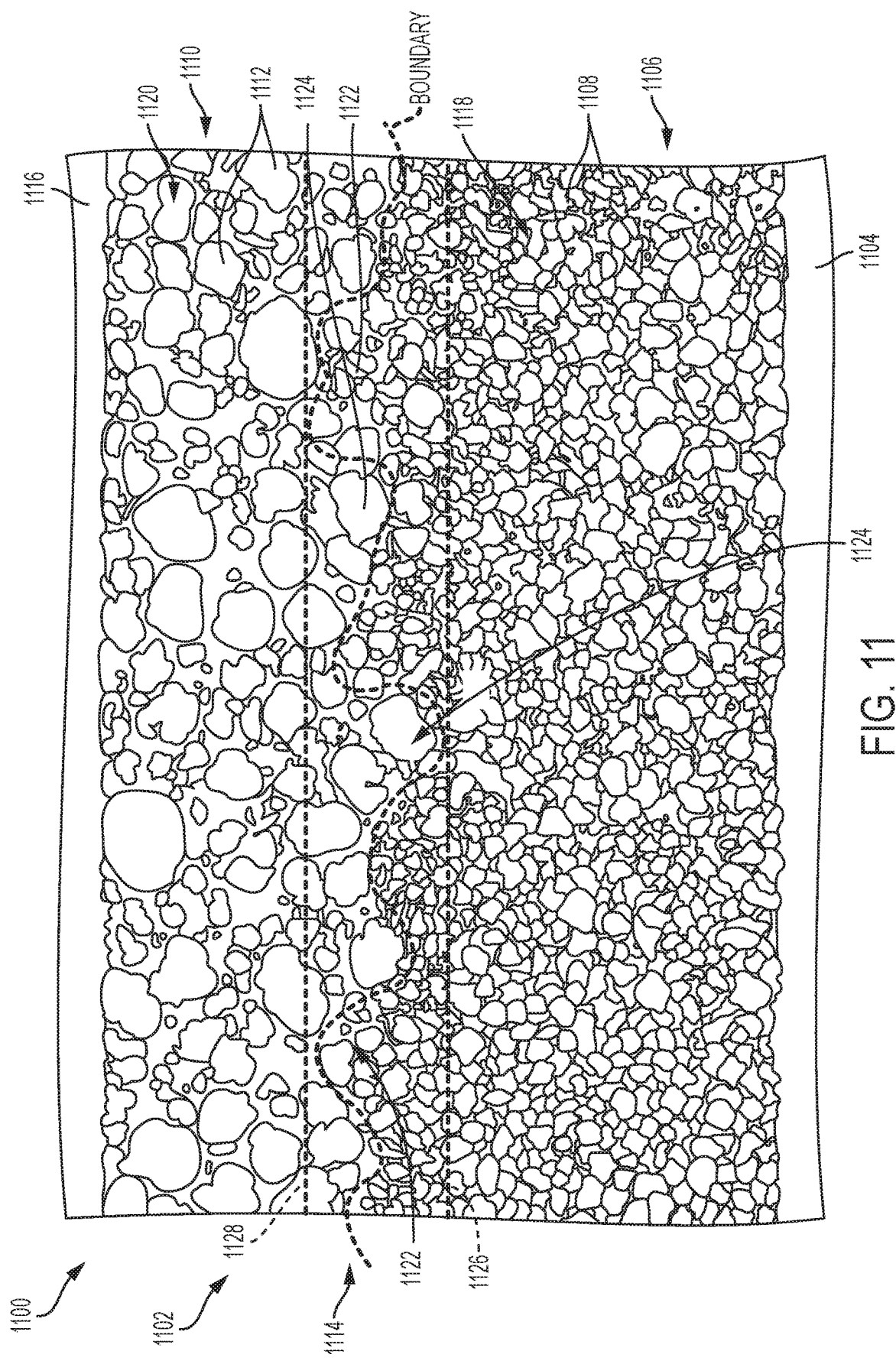
FIG. 11 a sectional view of an illustrative electrode portion having an interphase layer with interlocking fingers according to the present teachings

FIG. 11 is a sectional view of an illustrative electrode portion 1100 similar to electrode portions 900 and 1000. In this example, active material particles 1102 have been layered onto a current collector substrate 1104. The active materials comprise a first active material composite layer 1106 including a plurality of first active material particles 1108 adhered together by a first binder. First active material particles 1108 have a first average particle size 1118. Active material particles 1102 further comprise a second active material composite layer 1110 including a plurality of second active material particles 1112 adhered together by a second binder. Second active material particles 1112 have a second average particle size 1120, different than the first. In this example, second active material particles 1112 are smaller than first active material particles 1108. In other examples, the opposite is true.

A substantially non-planar interphase boundary 1114 is disposed between first active material composite layer 1106 and second active material composite layer 1110. The first active material composite layer has fingers 1122 extending into the second active material composite layer, and the second active material composite layer has fingers 1124 extending into the first active material composite layer. A lower limit 1126 and an upper limit 1128 of the interphase region is defined by the lowest point reached by first fingers 1122 and the highest point reached by second fingers 1124, respectively.

Structures of the FIGS. 9-11 may result from a method of forming an electrode (such as the method discussed below with respect to FIG. 12) that includes coating a second active material composite slurry onto a first layer of active material composite slurry. As a result of coating the two layers, solvent from the first active material composite slurry and the second active material composite slurry intermix to a limited degree, causing interpenetrating finger structures to form.

Although various electrode portions above are shown and described as having two active material composite layers coupled by an interphase, electrodes according to the present disclosure may include additional layers, such as a total of three or four active material composite layers. Each of the additional layers may be adhered to adjacent layer(s) by a respective interphase, substantially as described herein. In some examples, each of the interphase layers may be of the same type. In some examples, different interphase types may exist within the same electrode (i.e., between different pairs of active material composite layers).

The examples and embodiments discussed above are not meant to be limiting in any fashion, and may be considered together in a number of permutations and combinations. The examples given above include lithium ion batteries, however additional examples and embodiments could be used for any electrochemical or bipolar device that has a liquid/solid interface, gas/solid interface or a solid/solid interface where an electrolytic media interpenetrates a micro- or nano-structured electrode.

C. Illustrative Method

Figure 12:
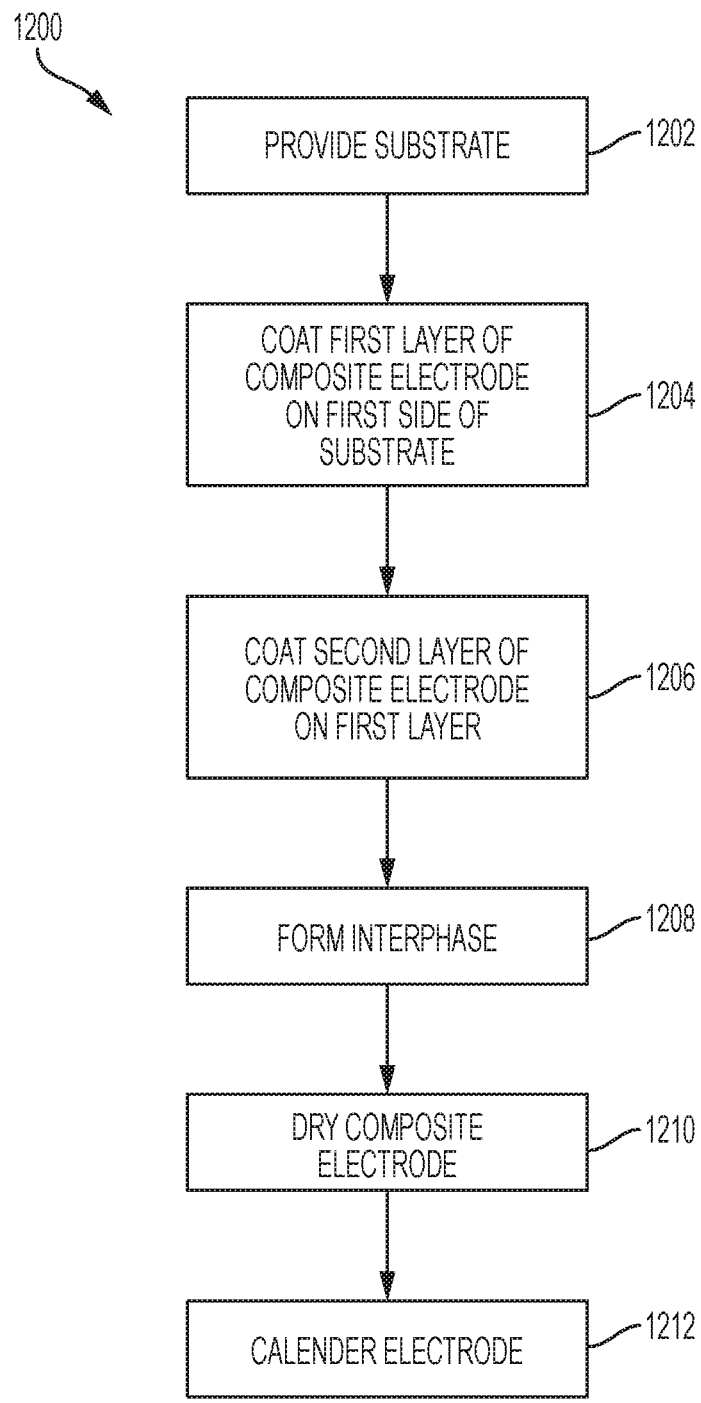
FIG. 12 is a flowchart depicting steps of an illustrative method for manufacturing an electrode having an interphase layer in accordance with aspects of the present disclosure.
Figure 13:
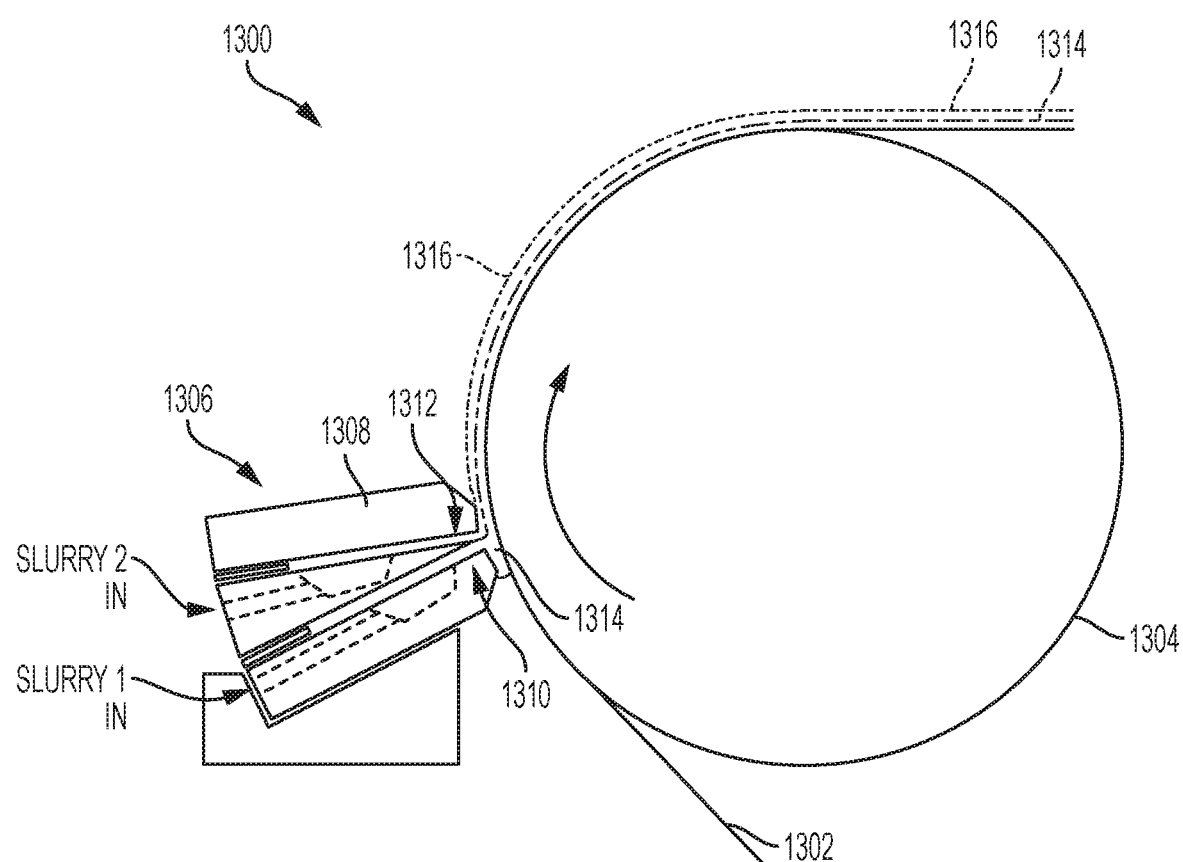
FIG. 13 is a schematic view of a device suitable for use in the method of FIG. 12.

This section describes steps of an illustrative method 1200 for forming an electrode including an interphase; see FIG. 12. Aspects of electrodes and manufacturing devices described herein may be utilized in the method steps described below. Where appropriate, reference may be made to components and systems that may be used in carrying out each step. These references are for illustration, and are not intended to limit the possible ways of carrying out any particular step of the method.

FIG. 12 is a flowchart illustrating steps performed in an illustrative method, and may not recite the complete process or all steps of the method. Although various steps of method 1200 are described below and depicted in FIG. 12, the steps need not necessarily all be performed, and in some cases may be performed simultaneously, or in a different order than the order shown.

Step 1202 of method 1200 includes providing a substrate. In some examples, the substrate comprises a current collector, such as current collectors 106, 108 (and others) described above. In some examples, the substrate comprises a metal foil.

Method 1200 next includes a plurality of steps in which at least a portion of the substrate is coated with an active material composite. This may be done by causing the substrate to move past an active material composite dispenser (or vice versa) that coats the substrate as described below.

Step 1204 of method 1200 includes coating a first layer of a composite electrode on a first side of the substrate. In some examples, the first layer may include a plurality of first particles adhered together by a first binder, the first particles having a first average particle size.

The coating process of step 1204 may include any suitable coating method(s), such as slot die, blade coating, spray-based coating, electrostatic jet coating, or the like. In some examples, the first layer is coated as a wet slurry of solvent (water, or NMP), binder, conductive additive, and active material. In some examples, the first layer is coated dry, as an active material with a binder and/or a conductive additive. Step 1204 may optionally include drying the first layer of the composite electrode.

Step 1206 of method 1200 includes coating a second layer of a composite electrode, on the first side of the substrate, onto the first layer, forming a multilayered (e.g., stratified) structure. The second layer may include a plurality of second particles adhered together by a second binder, the second particles having a second average particle size.

Step 1208 of method 1200 includes forming an interphase layer adhering the first layer to the second layer. Forming this interphase layer may be done by causing an interpenetration of the second layer into the first layer. This may result in an increased or decreased concentration of a binder and/or a conductive additive. Where the first layer and second layer contain different particle sizes, the interphase layer includes an intermixing of the first particles and the second particles, such that there is an interlocking of the first particles of the first layer to the second particles of the second layer.

In some examples, step 1208 occurs concurrent or immediately following step 1206. When these examples include drying the first layer of the composite electrode, a rewetting of the first layer occurs during step 1206 (coating the second layer onto the first layer). Rewetting of the first layer results in a gradient of porosity between active material particles within the first layer and/or active material particles within the interphase. Alternatively, rewetting of the first layer by the solvent from the second layer re-solvates the binder in the first layer to create an intermixing of first active material particles and second active material particles, resulting in the formation of interpenetrating fingers.

In some examples, forming an interphase in step 1208 comprises an additional deposition or coating of material onto the first layer, prior to the coating of the second layer. For example, a third type of binder may be deposited onto the first layer.

In some examples, steps 1204 and 1206 may be performed substantially simultaneously, such that the interphase of step 1208 is formed as interpenetrating fingers (e.g., fingers 914, 916). These fingers are formed by extruding both of the active material slurries through their respective orifices simultaneously. This forms a two-layer slurry bead and coating on the moving substrate. Difference in viscosities, difference in surface tensions, difference in densities, difference in solids contents, and/or different solvents used between the first active material slurry and the second active material slurry may be tailored to cause interpenetrating finger structures at the boundary between the two active material composite layers. In some embodiments, the viscosities, surface tensions, densities, solids contents, and/or solvents may be substantially similar. Creation of interpenetrating structures is facilitated by turbulent flow at the wet interface between the first active material electrode slurry and the second active material electrode slurry, creating partial intermixing of the two active material electrode slurries.

Too much intermixing between the two active material electrode slurries may result in the loss of a functional gradient in the resulting dried electrode composite, whereas too little intermixing between the two active material electrode slurries may result in a less-preferred, substantially planar interphase boundary. Additionally, to ensure proper curing in the drying process, the first layer (closest to the current collector) is configured to be dried from solvent prior to the second layer (further from the current collector) so as to avoid creating skin-over effects and blisters in the resulting dried coatings.

In general, the first active material composite slurry will have a first viscosity and the second active material composite slurry will have a second viscosity different than the first. In some examples, a difference in viscosities between the first active material electrode slurry and the second active material electrode slurry is targeted to be 100-1,000 centipoise (cP). In other examples, a difference in viscosities between the first active material electrode slurry and the second active material electrode slurry is targeted to be 2,000-5,000 cP. In other examples, a difference in viscosities between the first active material electrode slurry and the second active material electrode slurry is targeted to be 6,000-10,000 cP. In other examples, a difference in viscosities between the first active material electrode slurry and the second active material electrode slurry is targeted to be greater than 10,000 cP.

In some examples, a difference in surface tensions between the first active material electrode slurry and the second active material electrode slurry is targeted to be 0.5-1 dynes/cm. In other examples, a difference in surface tensions between the first active material electrode slurry and the second active material electrode slurry is targeted to be 1-5 dynes/cm. In other examples, a difference in surface tensions between the first active material electrode slurry and the second active material electrode slurry is targeted to be 6-10 dynes/cm. In other examples, a difference in surface tensions between the first active material electrode slurry and the second active material electrode slurry is targeted to be greater than 10 dynes/cm.

In some examples, a difference in densities between the first active material electrode slurry and the second active material electrode slurry is targeted to be 0.01-0.1 g/cc. In other examples, a difference in densities between the first active material electrode slurry and the second active material electrode slurry is targeted to be 0.2-0.5 g/cc. In other examples, a difference in densities between the first active material electrode slurry and the second active material electrode slurry is targeted to be 0.5-1 g/cc. In other examples, a difference in densities between the first active material electrode slurry and the second active material electrode slurry is targeted to be greater than 1 g/cc.

In some examples, a difference in solids content between the first active material electrode slurry and the second active material electrode slurry is targeted to be 0.25%-1%. In other examples, a difference in solids contents between the first active material electrode slurry and the second active material electrode slurry is targeted to be 2%-5%. In other examples, a difference in solids contents between the first active material electrode slurry and the second active material electrode slurry is targeted to be 6%-10%. In other examples, a difference in solids contents between the first active material electrode slurry and the second active material electrode slurry is targeted to be greater than 10%.

In some examples, the solvent(s) used in the first or second active material electrode slurry may consist of one or more solvents from group consisting of water, dimethylformamide, ethanol, propanol, propan-2-ol, butanol, 2-methyl-propan-1-ol, N-Methyl-2-pyrrolidone, dimethylsulfoxide, diethyl ether, dimethyl ether and ethyl methyl ether.

Method 1200 may optionally include drying the composite electrode in step 1210, and calendering the composite electrode in step 1212. In these optional steps, both the first and second layers may experience the drying process and the calendering process as a combined structure. In some examples, steps 1210 and 1212 may be combined (e.g., in a hot roll process). In some examples, drying step 1210 includes a form of heating and energy transport to and from the electrode (e.g., convection, conduction, radiation) to expedite the drying process. In some examples, calendering step 1212 is replaced with another compression, pressing, or compaction process. In some examples, calendering the electrode may be performed by pressing the combined first and second layers against the substrate, such that electrode density is increased in a non-uniform manner, with the first layer having a first porosity and the second layer having a lower second porosity.

D. Illustrative Dispenser Device

This section describes an illustrative system 1300 suitable for use with method 1200. In some examples, a slot-die coating head with at least two fluid slots, fluid cavities, fluid lines, and fluid pumps may be used to manufacture a battery electrode featuring at least one interpenetrating boundary layer between active material composite layers. In some examples, a dual-cavity slot-die coating head is used to manufacture a battery electrode featuring one interpenetrating boundary layer between two active material composite layers. In some examples, a triple-cavity slot-die coating head is used to manufacture a battery electrode featuring two interpenetrating boundary layers disposed between three active material composite layers. In other examples, additional cavities are used to create additional layers. System 1300 includes a dual-cavity slot-die coating head.

System 1300 is a manufacturing system in which a foil substrate 1302 (e.g., current collector substrate 804) is transported by a revolving backing roll 1304 past a stationary dispenser device 1306. Dispenser device 1306 may include any suitable dispenser configured to evenly coat one or more layers of active material slurry onto the substrate, as described with respect to steps 1204 and 1206 of method 1200. In some examples, the substrate may be held stationary while the dispenser head moves. In some examples, both may be in motion.

Dispenser device 1306 may, for example, include a dual chamber slot die coating device having a coating head 1308 with two orifices 1310 and 1312. A slurry delivery system supplies two different active material slurries to the coating head under pressure. Due to the revolving nature of backing roll 1304, material exiting the lower orifice or slot 1310 will contact substrate 1302 before material exiting the upper orifice or slot 1312. Accordingly, a first layer 1314 will be applied to the substrate and a second layer 1316 will be applied on top of the first layer.

Accordingly, corresponding steps of method 1200 may be characterized as follows. Causing a current collector substrate and an active material composite dispenser to move relative to each other, and coating at least a portion of the substrate with an active material composite, using the dispenser. Coating, in this case, includes: applying a first layer of slurry to the substrate using a first orifice or slot of the dispenser, and applying a second layer of a different slurry to the first layer using a second orifice or slot of the dispenser. These steps cause an interphase layer to form, thereby adhering the first layer to the second layer. As described above, based on different characteristics between the two slurries, the interphase layer may include an interpenetration of the first and second layers in which first fingers of the first layer interlock with second fingers of the second layer.

E. Additional Examples and Illustrative Combinations

This section describes additional aspects and features of electrodes having interphase structures, and related methods, presented without limitation as a series of paragraphs, some or all of which may be alphanumerically designated for clarity and efficiency. Each of these paragraphs can be combined with one or more other paragraphs, and/or with disclosure from elsewhere in this application (including the claims), in any suitable manner. Some of the paragraphs below expressly refer to and further limit other paragraphs, providing without limitation examples of some of the suitable combinations.

A0. An electrode comprising:
a current collector substrate; and
an active material composite layered onto the substrate, wherein the active material composite comprises:
    a first layer including a plurality of first active material particles adhered together by a first binder, the first active material particles having a first average particle size;
    a second layer including a plurality of second active material particles adhered together by a second binder, the second active material particles having a second average particle size; and
    an interphase layer adhering the first layer to the second layer, the interphase layer including an intermixing of the first active material particles and the second active material particles, such that the interphase layer has a third average active material particle size, a magnitude of which is between the first average active material particle size and the second average active material particle size.

A1. The electrode of A0, wherein the interphase further comprises a third binder adhering the first active material particles to the second active material particles, wherein the third binder has a higher concentration than the first binder and the second binder.

A2. The electrode of A0, wherein the active material composite comprises a first face in direct contact with the current collector substrate and a second face opposite the first face, the second face in contact with a separator.

A3. The electrode of A0, wherein the interphase layer comprises an intermixing of the first active material particles and the second active material particles, such that the interphase layer comprises a gradual transition from the first active material particles of the first layer transition to the second active material particles of the second layer.

A4. The electrode of A0, wherein the interphase layer comprises a plurality of fluid passages defined at least in part by the first active material particles and the second active material particles.

A5. The electrode of A4, wherein the plurality of fluid passages are further defined by a plurality of conductive additive particles.

A6. A secondary battery comprising the electrode of A0.

A7. The electrode of A0, wherein the electrode is an anode, and the first particles comprise a graphitic carbon.

A8. The electrode of A7, wherein the second particles comprise carbon.

B0. An electrode comprising:
  a current collector substrate; and
  an active material composite layered onto the substrate, wherein the active material composite comprises:
    a first layer including a plurality of first active material particles adhered together by a first binder, the first active material particles having a first average particle size;
    a second layer including a plurality of second active material particles adhered together by a second binder, the second active material particles having a second average particle size; and
    an interphase layer adhering the first layer to the second layer, the interphase layer including an intermixing of the first active material particles and the second active material particles, such that the interphase layer comprises a gradual transition from the first active material particles of the first layer to the second active material particles of the second layer.

B1. The electrode of B0, wherein the interphase further comprises a third binder adhering the first active material particles to the second active material particles.

B2. The electrode of B0, wherein the active material composite comprises a first face in direct contact with the current collector substrate and a second face opposite the first face, the second face in contact with a separator.

B3. The electrode of B0, wherein the interphase layer comprises an intermixing of the first active material particles and the second active material particles, such that the interphase layer has a third average active material particle size intermediate the first average active material particle size and the second average active material particle size.

B4. The electrode of B0, wherein the interphase layer comprises a plurality of fluid passages defined at least in part by the first active material particles and the second active material particles.

B5. The electrode of B4, wherein the plurality of fluid passages are further defined by a plurality of conductive additive particles.

C0. A method of manufacturing an electrode, the method comprising:
  causing a current collector substrate and an active material composite dispenser to move relative to each other; and
  coating at least a portion of the substrate with an active material composite, using the dispenser, wherein coating includes:
    applying a first layer to the substrate using a first orifice of the dispenser, the first layer including a plurality of first active material particles and a first binder, the first active material particles having a first average particle size;
    applying a second layer to the first layer using a second orifice of the dispenser, the second layer including a plurality of second active material particles and a second binder, the second active material particles having a second average particle size; and
    forming an interphase layer adhering the first layer to the second layer, the interphase layer including an intermixing of the first active material particles and the second active material particles, such that the interphase layer comprises a gradual transition from the first active material particles of the first layer to the second active material particles of the second layer.

C1. The method of C0, wherein the interphase layer comprises an intermixing of the first active material particles and the second active material particles, such that the interphase layer has a third average active material particle size sized between the first average active material particle size and the second average active material particle size.

C2. The method of C0, wherein causing the substrate and the dispenser to move relative to each other comprises moving the substrate using a backup roll.

C3. The method of C0, wherein the dispenser comprises a dual chamber slot die coating head, such that the first orifice is a first slot of the coating head and the second orifice is a second slot of the coating head.

C4. The method of C0, further comprising drying the first layer prior to applying the second layer.

C5. The method of C0, further comprising:
  calendering the electrode by pressing the combined first and second layers against the substrate, increasing an overall density of the electrode and decreasing an overall porosity of the electrode.

D0. An electrode comprising:
  a current collector substrate; and
  an active material composite layered onto the substrate, wherein the active material composite comprises:
    a first layer including a plurality of first active material particles adhered together by a first binder, the first active material particles having a first average particle size;
    a second layer including a plurality of second active material particles adhered together by a second binder, the second active material particles having a second average particle size; and
    an interphase layer adhering the first layer to the second layer, the interphase layer including a non-planar boundary between the first and second layers, such that the first layer and the second layer are interpenetrated and the interphase layer has a third average particle size, a magnitude of which is between the first average particle size and the second average particle size.

D1. The electrode of D0, the non-planar boundary comprising a plurality of substantially discrete first fingers of the first active material particles interlocked with a plurality of substantially discrete second fingers of the second active material particles.

D2. The electrode of D1, wherein the first fingers each have a length greater than approximately two times the smaller of the first average particle size and the second average particle size.

D3. The electrode of D0, wherein the first layer comprises a first face in direct contact with the current collector substrate and the second layer has a second face in direct contact with a separator (e.g., the second face is on an opposite side of the active material composite from the first face).

D4. The electrode of D0, wherein the interphase layer comprises a plurality of fluid passages defined at least in part by the first active material particles and the second active material particles.

D5. The electrode of D4, wherein the plurality of fluid passages are further defined by a plurality of conductive additive particles.

D6. A secondary battery comprising the electrode of D0.

D7. The electrode of D0, wherein the electrode is an anode, and the first active material particles comprise carbon.

E0. An electrode comprising:
a current collector substrate; and
an active material composite layered onto the substrate, wherein the active material composite comprises:
 a first layer including a plurality of first active material particles having a first distribution of particle sizes;
 a second layer including a plurality of second active material particles having a second distribution of particle sizes; and
 an interphase layer adhering the first layer to the second layer, the interphase layer including a non-planar interpenetration of the first and second layers in which first fingers of the first layer interlock with second fingers of the second layer.

E1. The electrode of E0, wherein the first fingers each have a length greater than approximately two microns.

E2. The electrode of E0, wherein the first layer has a first face in direct contact with the current collector substrate and the second layer has a second face in direct contact with a separator (e.g., the second face and the first face are on opposing sides of the active material composite).

E3. The electrode of E0, wherein the first layer has a first porosity, the second layer has a different second porosity, and the interphase layer has a third porosity intermediate the first porosity and the second porosity.

E4. The electrode of E0, wherein the interphase layer comprises a plurality of fluid passages defined at least in part by the first particles and the second particles.

E5. A secondary battery comprising the electrode of E0.

F0. A method of manufacturing an electrode, the method comprising:
 causing a current collector substrate and an active material composite dispenser to move relative to each other; and
 coating at least a portion of the substrate with an active material composite, using the dispenser, wherein coating includes:
  applying a first layer to the substrate using a first orifice of the dispenser, the first layer including a first active material composite slurry having a plurality of first active material particles and a first binder, the first active material particles having a first average particle size and a first viscosity;
  applying a second layer to the first layer using a second orifice of the dispenser, the second layer including a second active material composite slurry having a plurality of second active material particles and a second binder, the second active material particles having a second average particle size and a second viscosity; and
  forming an interphase layer adhering the first layer to the second layer, the interphase layer including an interpenetration of the first and second layers in which first fingers of the first layer interlock with second fingers of the second layer.

F1. The method of F0, wherein the interphase layer has a third average active material particle size between the first average active material particle size and the second average active material particle size.

F2. The method of F0, wherein causing the substrate and the dispenser to move relative to each other comprises moving the substrate using a backup roll.

F3. The method of F0, wherein the dispenser comprises a dual chamber slot die coating head, such that the first orifice is a first slot of the coating head and the second orifice is a second slot of the coating head.

F4. The method of F0, wherein the first viscosity and the second viscosity differ by at least one hundred centipoise (cP).

F5. The method of F0, further comprising:
 calendering the electrode by pressing the combined first and second layers against the substrate, such that an electrode density is increased in a non-uniform manner, the first layer having a first porosity and the second layer having a second porosity less than the first porosity.

G0. The electrode of D0, E0, or F0, including fingers comprising domains of first particles interlocking with domains of second particles.

G1. The electrode of D0, E0, or F0, wherein the boundary of the interphase has a surface area that is at least twice as large as would be a substantially planar boundary between the first layer and the second layer.

G2. The electrode of D0, E0, or F0, wherein the first layer comprises a first homogeneous structure having a first porosity, and the second layer comprises a second homogeneous structure having a second porosity different than the first porosity.

Advantages, Features, Benefits

The different embodiments and examples of electrode structures and related methods described herein provide several advantages over known solutions. For example, illustrative embodiments and examples described herein facilitate improved ionic communication over examples having a substantially planar inter-layer boundary. Interphase layers of the present disclosure provide improved mechanical integrity, electrical communication, ionic conduction, and resistance to SEI buildup, as the interpenetration and interlocking of active material composite layers lowers impedance between the two layers.

Additionally, and among other benefits, illustrative embodiments and examples described herein have interphase layers comprising a network of fluid passageways defined by active material particles, binder, and/or carbon additive. These fluid passages are not hampered by calendering-induced changes in mechanical or morphological state of the particles. In contrast, a substantially planar boundary is often associated with the formation of a crust layer upon subsequent calendering. Such a crust layer is disadvantageous for electronic percolation, as described above, and also serves to significantly impede ion conduction through the interphase region. This increases the tortuosity of the overall electrode as ions face a barrier within the electrode composite as they traverse through the thickness of the electrode, causing the power density of the battery to suffer significantly. Furthermore, such a crust layer also represents a localized compaction of active material particles that effectively result in reduced pore volumes; this may be an issue of particular importance for anode electrodes. Further in the case of anode electrodes, SEI film buildup on active material particles clogs the pores at a quicker rate, leading to increased cell polarization and lithium plating, ultimately leading to poor cycle life and compromised safety.

Additionally, and among other benefits, illustrative embodiments and examples described herein provide improved electrical communication, as the interpenetration or intermixing of active materials and conductive additives lowers impedance between the two layers.

Additionally, and among other benefits, illustrative embodiments and examples described herein allow improved mechanical coherence of the electrode. Peel strength is such that the two layers do not preferentially separate at the interphase.

Additionally, and among other benefits, illustrative embodiments and examples described herein provide improved mechanical integrity of the electrode structure sufficient to accommodate the stresses induced by volume expansion and contraction during the charging and discharging processes when assembled into a battery, improving cycle life of the battery.

Additionally, and among other benefits, illustrative embodiments and examples described herein provide a non-planar boundary between the two active material composite layers, such that the active material particles of the first active material composite layer will have improved electronic percolation with the active material particles of the second active material composite layer, and vice versa, resulting in reduced impedance for the overall electrode and cell.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of manufacturing an electrode for an electrochemical cell, the method comprising:
    causing relative motion between an active material composite dispenser and a current collector substrate on which is disposed a first layer of active material composite, wherein the first layer includes a plurality of first active material particles and a first binder, the first active material particles having a first average particle size and a first viscosity; and
    applying a second layer of active material composite to the first layer, using an orifice of the dispenser, the second layer including an active material composite slurry having a plurality of second active material particles and a second binder, the second active material particles having a second average particle size and a second viscosity;
    wherein applying the second layer of active material composite forms an interphase layer adhering the first layer to the second layer, the interphase layer including an interpenetration of the first and second layers in which first fingers of the first layer interlock with second fingers of the second layer.

2. The method of claim 1, wherein the interphase layer has a third average active material particle size between the first average active material particle size and the second average active material particle size.

3. The method of claim 1, wherein causing the relative motion comprises moving the current collector substrate using a backup roll.

4. The method of claim 1, wherein the dispenser comprises a slot die coating head, such that the orifice is a slot of the coating head.

5. The method of claim 1, wherein the first viscosity and the second viscosity differ by at least one hundred centipoise (cP).

6. The method of claim 1, further comprising:
    calendering the electrode by pressing the combined first and second layers against the current collector substrate, such that an electrode density is increased in a non-uniform manner, the first layer having a first porosity and the second layer having a second porosity less than the first porosity.

7. The method of claim 6, wherein the electrode includes exactly one crust layer.

8. The method of claim 1, wherein a boundary between the first layer and the second layer has a surface area that is at least twice as large as a planar cross-section taken parallel to the current collector substrate.

9. A method of manufacturing an electrode for an electrochemical cell, the method comprising:
    causing a current collector substrate and an active material composite dispenser to move relative to each other, wherein the current collector substrate is at least partially coated by an uncalendered first layer of active material composite including a plurality of first active material particles and a first binder, the first active material particles having a first average particle size; and
    coating at least a portion of the first layer with a second layer of active material composite, using an orifice of the dispenser, wherein the second layer includes a plurality of second active material particles and a second binder, the second active material particles having a second average particle size; and
    forming an interphase layer adhering the first layer to the second layer, the interphase layer including an intermixing of the first active material particles and the second active material particles, such that the interphase layer comprises a gradual transition from the first active material particles of the first layer to the second active material particles of the second layer.

10. The method of claim 9, wherein the interphase layer comprises an intermixing of the first active material particles and the second active material particles, such that the interphase layer has a third average active material particle size sized between the first average active material particle size and the second average active material particle size.

11. The method of claim 9, wherein causing the current collector substrate and the dispenser to move relative to each other comprises moving the substrate using a backup roll.

12. The method of claim 9, wherein the dispenser comprises a slot die coating head, such that the orifice is a slot of the coating head.

13. The method of claim 9, further comprising:
calendering the electrode by pressing the combined first and second layers against the current collector substrate, increasing an overall density of the electrode and decreasing an overall porosity of the electrode.

14. A method of manufacturing an electrode for an electrochemical cell, the method comprising:
applying a first layer of a first active material composite slurry to a foil substrate, wherein the first active material composite slurry comprises a plurality of first active material particles and a first binder, the first active material particles having a first average particle size and a first viscosity; and
applying a second layer of a second active material composite slurry to the first layer before calendering, using a slot of a slot-die coating head dispenser, wherein the second active material composite slurry comprises a plurality of second active material particles and a second binder, the second active material particles having a second average particle size and a second viscosity;
wherein an interpenetrating boundary layer is formed between the first layer and the second layer.

15. The method of claim 14, further comprising causing the foil substrate and the slot of the slot-die coating head dispenser to move relative to each other.

16. The method of claim 14, wherein the slot-die coating head dispenser comprises a single chamber slot die coating head.

17. The method of claim 14, wherein the first viscosity and the second viscosity differ by at least one hundred centipoise (cP).

18. The method of claim 14, further comprising:
calendering the combined first and second layers against the foil substrate, such that an electrode density is increased in a non-uniform manner, the first layer having a first porosity and the second layer having a second porosity less than the first porosity.

19. The method of claim 18, wherein the electrochemical cell electrode includes exactly one crust layer.

20. The method of claim 14, wherein the boundary layer has a surface area that is at least twice as large as a planar cross-section taken parallel to the foil substrate.

* * * * *